United States Patent [19]
Myers

[11] Patent Number: 5,516,126
[45] Date of Patent: May 14, 1996

[54] SNOW SKI OR RUNNER

[76] Inventor: Jeff D. Myers, 7525 N. Shadow Mountain Rd., Paradise Valley, Ariz. 85253

[21] Appl. No.: 401,947

[22] Filed: Mar. 10, 1995

[51] Int. Cl.$^6$ ........................................ A63C 5/03
[52] U.S. Cl. ................ 280/14.3; 280/21.1; 280/28.11; 441/65
[58] Field of Search ..................... 280/604, 606, 280/603, 11.18, 11.12, 845, 14.2, 14.3, 21.1, 22.1, 18, 28.11, 28.14, 14.1, 87.041, 87.042, 25, 26; 180/180, 181; 441/65, 72, 68

[56] References Cited

U.S. PATENT DOCUMENTS

| | | | |
|---|---|---|---|
| 2,564,420 | 8/1951 | Brown | 280/14.2 |
| 3,139,287 | 6/1964 | Annis | 280/28.11 |
| 3,451,689 | 6/1969 | Owens | 280/14.3 |
| 4,256,319 | 3/1981 | Winter | 280/28.11 |
| 4,533,150 | 8/1985 | Hardy | 280/14.2 |
| 4,606,548 | 8/1986 | Little | 280/14.3 |
| 4,756,700 | 7/1988 | Coleman | 441/65 |
| 5,277,141 | 1/1994 | Csepregi | 280/28.11 |
| 5,351,975 | 10/1994 | Petoud | 280/14.3 |

Primary Examiner—Anne Marie Boehler
Attorney, Agent, or Firm—Warren F. B. Lindsley

[57] ABSTRACT

A snow ski or runner on which the user stands with both feet juxtapositioned and parallelly arranged with the longitudinally axis of the ski. Both hands of the user grasps and manipulates in a cyclic manner a movable handle. Each foot of the user controls a foot pad for causing a portion of the foot pad to penetrate and extend from the bottom of the ski for steering purposes when foot pressure is applied to the foot pads.

5 Claims, 2 Drawing Sheets

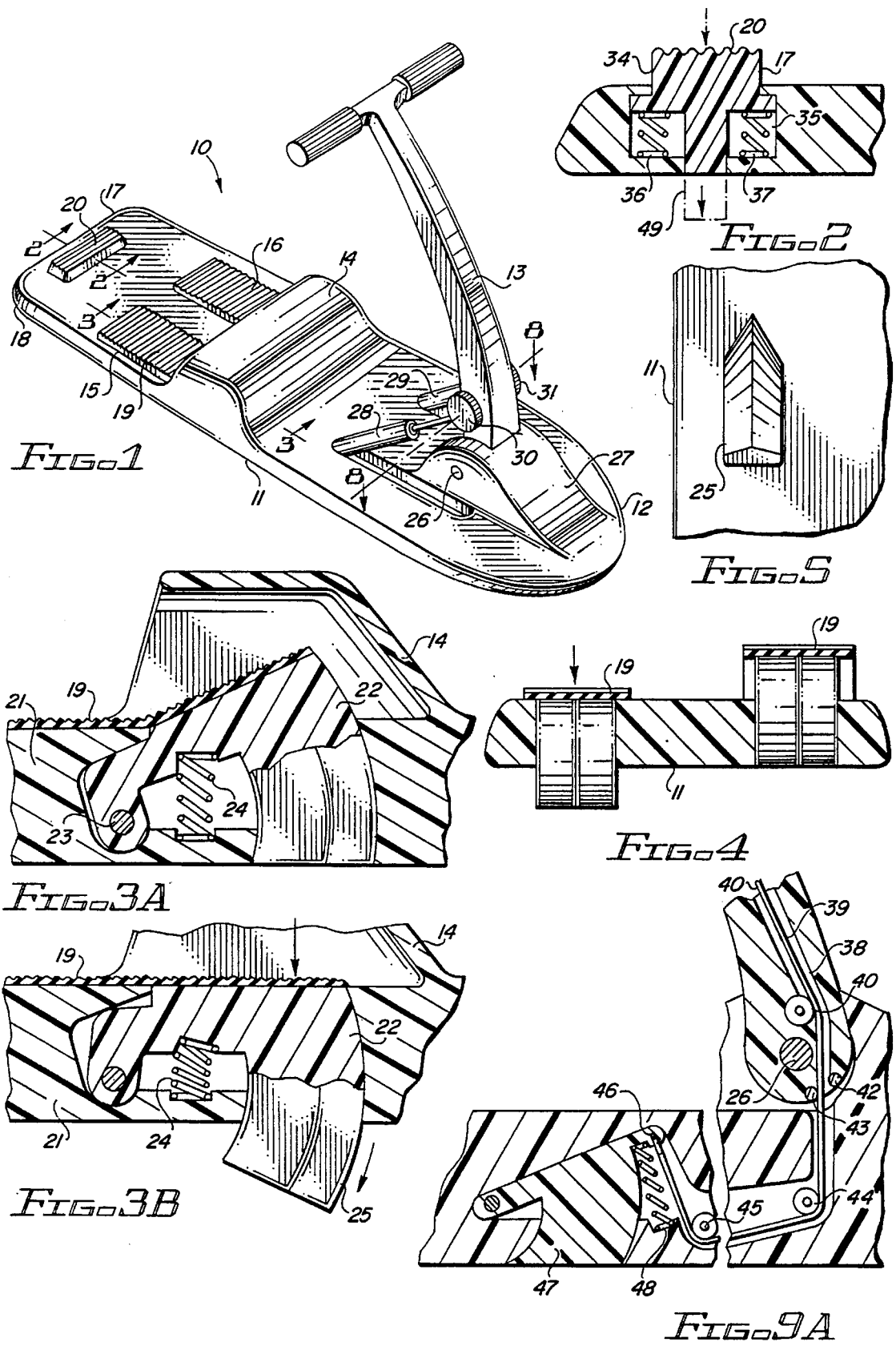

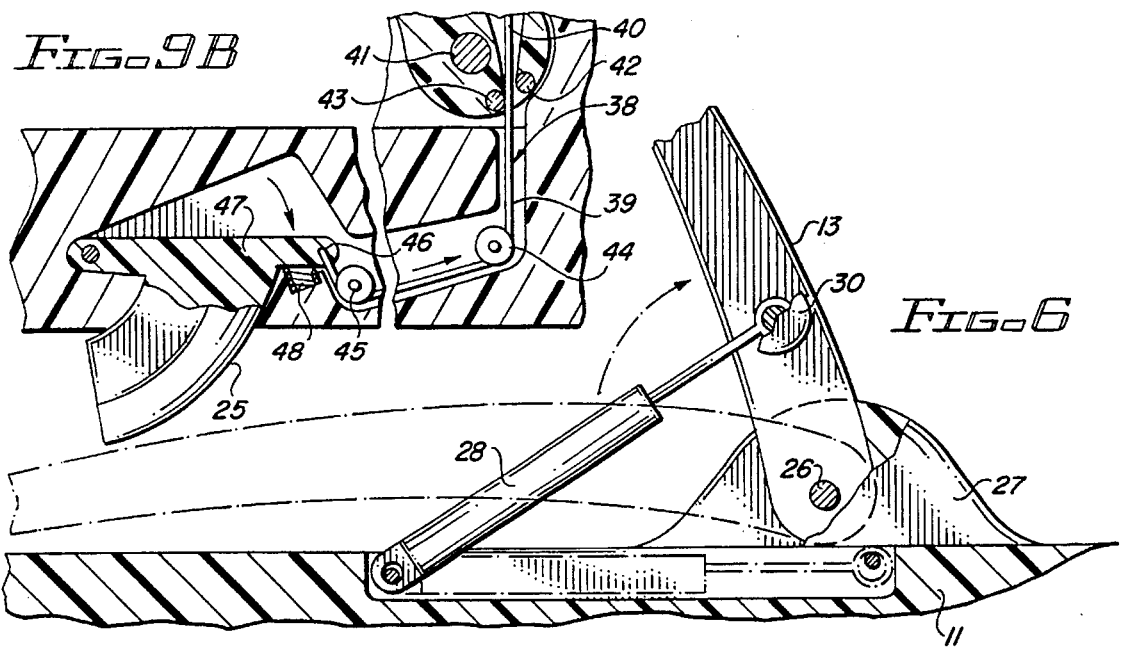
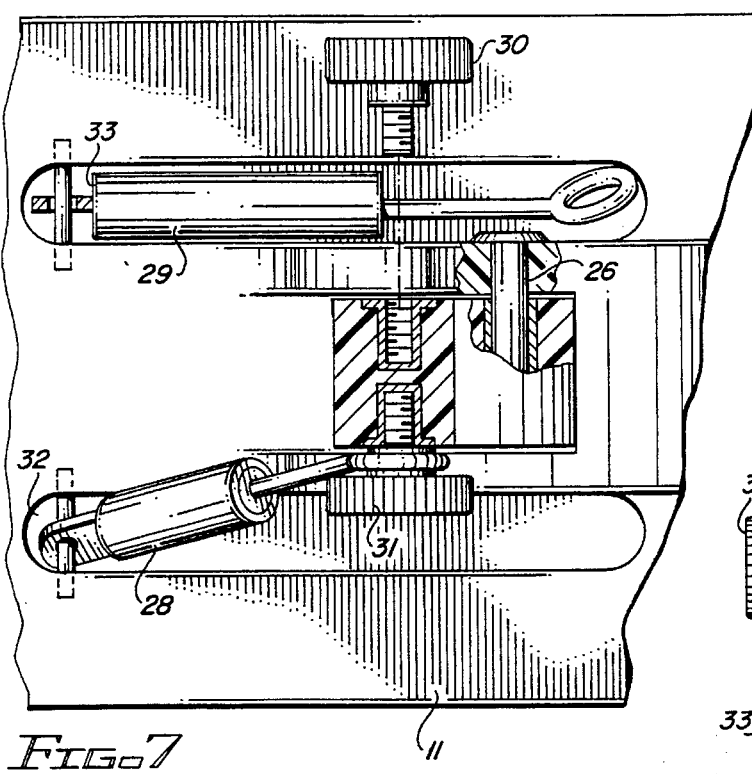
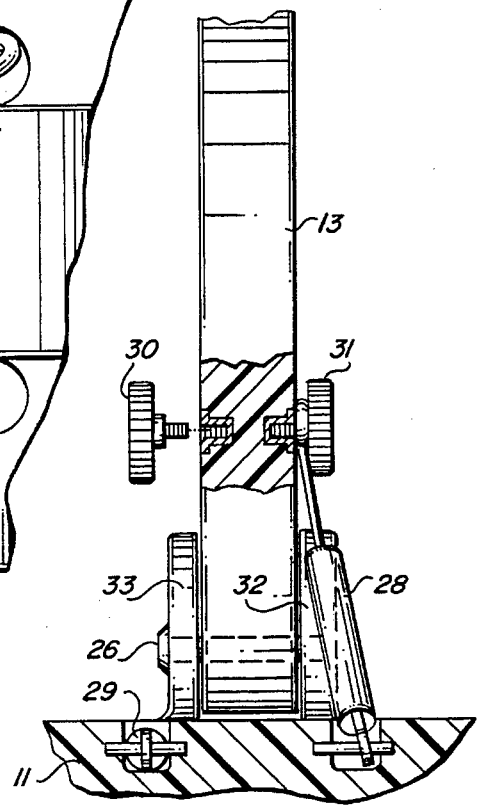

SNOW SKI OR RUNNER

BACKGROUND OF THE INVENTION

This invention relates to a sliding runner and more particularly to a runner operable on snow the rudder and other control features of which are operable by the feet and hands of the user during movement thereof.

DESCRIPTION OF THE PRIOR ART

Self propelled water planing devices are known which comprise a jet type motor means controlled by the user in the manner of a motorcycle.

None of the known devices comprise a runner like device on which the user stands with both feet parallelly arranged one on each side of the longitudinal axis of the runner. Both hands of the user grab and manipulate a movable handle in a cyclic manner using peddle manipulation and weight transfer to steer the device.

SUMMARY OF THE INVENTION

In accordance with the invention claimed, a new and improved runner is disclosed which is operable by the hands and feet of the user.

It is, therefore, one object of this invention to provide a runner or sliding platform like device for snow or water use that is operable by the feet of a user positioned on parallelly arranged pads arranged on the top surface of the runner with the hands of a user grasping a cyclically movable handle.

Another object of this invention is to provide a lightweight snow ski with the hands and feet of the user controlling its downhill movement.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

The present invention may be more readily described by reference to the accompanying drawings, in which:

FIG. 1 is a perspective view of a runner such as a ski embodying the invention;

FIG. 2 is a cross sectional view of FIG. 1 taken along the line 2—2;

FIG. 3A is a cross sectional view of FIG. 1 taken along the line 3—3; with the foot controls shown in an inactive position;

FIG. 3B is a cross sectional view similar to FIG. 3A with the foot pad in a depressed position;

FIG. 4 is an end view of the ski guiding means shown in FIG. 1;

FIG. 5 is a bottom view of the ski guiding means shown in FIG. 3B;

FIG. 6 is a cross sectional view of the handle shown in FIG. 1 and illustrating its shock absorbers;

FIG. 7 illustrates a top view of the handle mechanism shown in FIG. 1;

FIG. 8 is an end view of the handle mechanism shown in FIG. 1;

FIG. 9A is a cross sectional view of a modification of the handle shown in FIG. 1 in an inactive position; and FIG. 9B is a cross sectional view similar to FIG. 9a in the handle biased position.

DESCRIPTION OF THE PREFERRED EMBODIMENT

Referring more particularly to the drawings by characters of reference, FIG. 1 discloses a runner such as, for example, a ski 10 for use on snow or water and comprising an elongated board 11 rounded off at its front end 12 to aid in passing over the water or snow surface (not shown) on which it is intended to operate.

The top surface of board 11 is provided with a pivotally mounted handle at its front end 12, a hollow housing 14 mounted midway its length, a pair of ski control foot pads 15 and 16 and a brake pad 17 at its rear end 18.

As noted from FIGS. 1, 3A and 3B the top of foot pads 15 and 16 are provided with a ribbed resilient, flexible surface 19 for aiding in substantially preventing or controlling foot slippage. A similar surface 20 is provided on the top surface of brake pad 17.

As shown in FIGS. 3A and 3B, boot pads 15 and 16 each comprise a relatively stationary portion 21 and a pivot movable portion 22 mounted by means of pin 23 on board 10 and biased by a spring 24 to an inactive position as shown in FIG. 3A. The movable portion 22 of the foot pads extend into the hollow interior of housing 14.

As noted in FIG. 3B, when portion 22 is pivotally moved by a foot of a user to the position shown in FIG. 3B, a steering blade 25 pivotally moves outwardly of board 10 simultaneously compressing spring 24 which is mounted between portions 21 and 22 of the foot pad mechanism.

Handle 13 is pivotally mounted by a pin 26 secured in a housing 27 formed on the top of board 11 the movement of which is controlled by a pair of shock absorbers 28 and 29 each fastened at one end to board 11 and at their other ends on a different side of handle 13 to handle 13 by knurled headed threaded bolts 30 and 31, as shown in FIGS. 7 and 8.

It should be noted that bolts 30 and 31 may be removed from their threaded engagement with handle 13 and handle 13 then lowered into respective slots 32 and 33 for storage or shipping purposes.

As shown in FIG. 2, brake pad 17 comprises a reciprocally movable member 34 which is movable in a slot 35 formed in board 11 and biased to its inactive state, shown by the full lines of this member, by a pair of springs 36 and 37. Thus, when braking is applied to the ski by depressing member 34 against the bias of springs 36 and 37, the end 49 of the leg of this T-shaped configuration penetrates the surface on which the ski is operating such as snow for control purposes.

FIGS. 9A and 9B illustrate a modification of the handle control mechanism shown in FIG. 1 wherein the shock absorbers 28 and 29 are replaced by a cable mechanism 38. This control mechanism comprises a cable 39 anchored at its end 40 in handle 13 with its other end thereof passing over a roller 41, between two control rollers 42 and 43 and over rollers 44 and 45 to an anchor point 46 on a foot pedal 47 that is biased by a spring 48 to the handle position shown in FIG. 9A.

Although a ski has been shown and described, it is intended that the invention be directed broadly to a runner for operating on snow or water. The runner is intended to cover various forms of devices operable on a supporting surface.

Since but two embodiments of the invention have been illustrated and described, it will be apparent to those skilled in the art that various changes and modifications may be made therein without departing from the spirit of the invention or from the scope of the appended claims.

What is claimed is:

1. A runner operable on a supporting surface comprising:

an elongated board having an arcuate front end, a blunt rear end, a flat bottom surface and a contoured top surface, a handle pivotally mounted on said front end of said runner to extend laterally therefrom the reciprocal movement of which is controlled by a spring biasing means, a pair of reciprocally movable foot pads each one of which is biased to an inactive position, said foot pads each comprising a member which extends outwardly of the bottom surface of said runner when foot pressure is applied to one or both of said pads for steering purposes, a brake pad mounted in an aperture in said rear portion of said board and biased to an inactive position, and when moved by foot pressure to an active position causing a part of said foot pad to extend outwardly of the bottom surface of said runner for braking purposes, and said spring biasing means connected between said board and said handle for biasing said handle in a given direction, said spring biasing means comprising a pair of shock absorbers one mounted on each side of said handle.

2. The runner operable on a supporting surface as set forth in claim 1 wherein:

each of said foot pads comprise a movable part which is rotated by foot pressure thereon to force a part thereof outwardly of the bottom surface of said runner for runner control purposes.

3. The runner set forth in claim 2 wherein:

said foot pads are parallelly arranged on each side of the longitudinal axis of said board.

4. The runner set forth in claim 1 wherein:

said elongated board comprises a ski.

5. A runner operable on a supporting surface comprising:

an elongated board having an arcuate front end, a blunt rear end, a flat bottom surface and a contoured top surface, a handle pivotally mounted on said front end of said runner to extend laterally therefrom the reciprocal movement of which is controlled by a spring biasing means, a pair of reciprocally movable foot pads each one of which is biased to an inactive position, said foot pads each comprising a member which extends outwardly of the bottom surface of said runner when foot pressure is applied to one or both of said pads for steering purposes, a brake pad mounted in an aperture in said rear portion of said board and biased to an inactive position, and when moved by foot pressure to an active position causing a part of said foot pad to extend outwardly of the bottom surface of said runner for braking purposes, said spring biasing means connected between said board and said handle for biasing said handle in a given direction, said spring biasing means comprising a pair of shock absorbers one mounted on each side of said handle, and a pair of slots formed in the top surface of said board juxtapositioned to said shock absorbers for housing the shock absorbers when disconnected from said handle for shipping or storage purposes.

* * * * *